Figure 10:
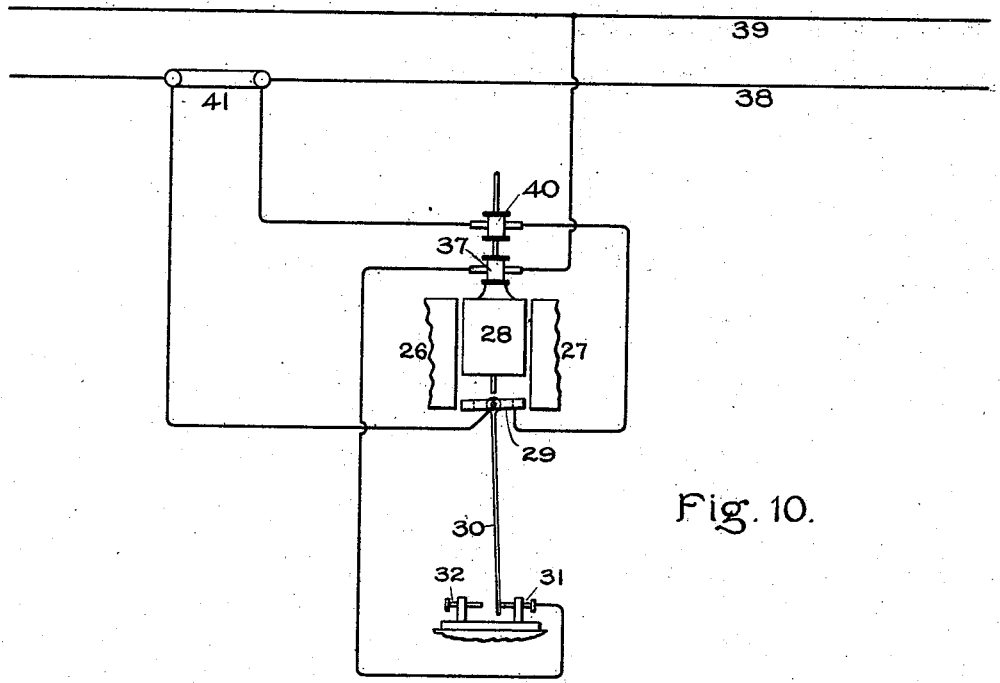

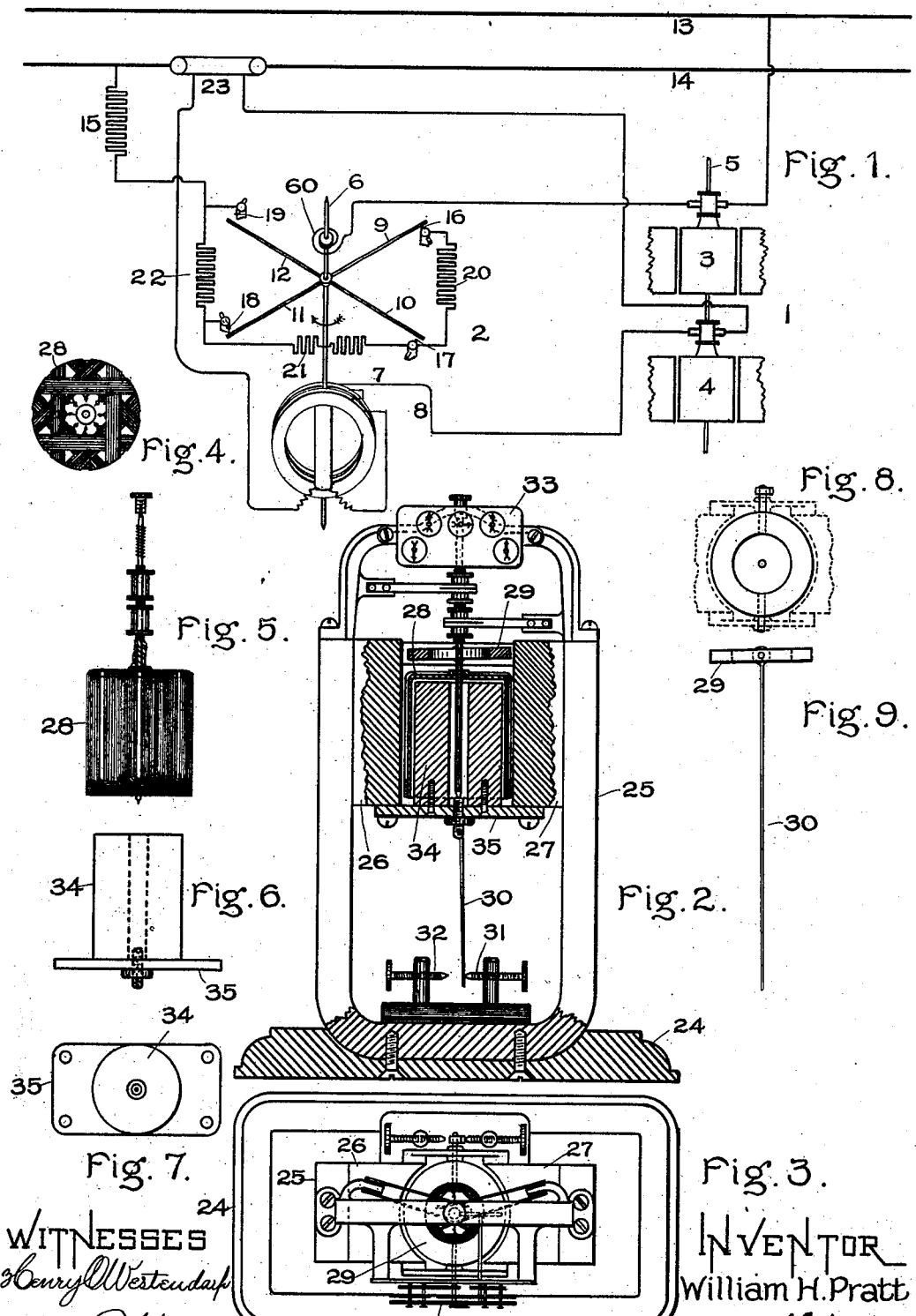

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

ELECTRIC METER.

SPECIFICATION forming part of Letters Patent No. 712,090, dated October 28, 1902.

Application filed March 15, 1901. Serial No. 51,225. (No model.)

*To all whom it may concern:*

Be it known that I, WILLIAM H. PRATT, a citizen of the United States, residing at Lynn, county of Essex, State of Massachusetts, have invented certain new and useful Improvements in Electric Meters, (Case No. 1,412,) of which the following is a specification.

My invention relates to that type of recording electric meter in which a mechanically-driven electromotive-force-generating device acts in conjunction with a controlling device of the dynamometer type which by its deflection in one direction acts to start up the electromotive-force-generating device and on its return tends to stop the same. The electromotive-force-generating device acts upon the controlling device in such a way as to return the parts to their original positions, this return taking place when the speed of the generating device reaches substantial proportionality with the quantity measured by the controlling device.

One feature of my invention consists in passing through the controlling device a current which is the resultant of two electromotive forces, one representing the current or other quantity to be measured, the other being produced by the electromotive-force-generating device and proportional to the speed of movement of the same. These two electromotive forces are in opposition to each other, so that when they become equal current ceases to flow, the controlling device then returning to its zero position. The electromotive-force-generating device is usually in the form of a motor-generator, the motor-current of which is controlled by a switch actuated by the controlling device referred to. When current flows in the controlling device, the circuit of the motor-generator is closed and remains closed until the speed of the same reaches substantial proportionality with the current or other quantity to be measured. The electromotive force produced by the motor-generator then balances the other electromotive force flowing in the controlling device, which thereupon, by reason of a restoring moment, returns to its zero or off position, thus opening the circuit of the motor-generator, which slows up in speed as a consequence. The balance of electromotive forces is thus disturbed, causing current to flow anew in the controlling device, which again closes the motor-circuit. Thus alternate opening and closing of the motor-generator circuit goes on as long as there is any current to be measured, the speed of the motor-generator remaining approximately proportional to the quantity to be measured. A counter geared to the shaft of the motor-generator integrates the consumption of energy.

The various features which go to make up my invention will be better understood by reference to the following description, taken in connection with the accompanying drawings, while the scope of the invention will be more particularly set forth in the appended claims.

In the drawings, Figure 1 is a diagrammatic representation of one form which my invention may assume. Figs. 2 and 3 represent, respectively, an elevation and plan of a mechanical embodiment of my invention somewhat different in form from that represented diagrammatically in Fig. 1. Figs. 4 to 9, inclusive, represent details of the metering device shown in Figs. 2 and 3, while Fig. 10 is a diagram of the circuits of said metering device.

The instrument represented in diagram in Fig. 1 comprises, roughly speaking, a motor-generator set 1 and a controlling device 2. The motor-generator set, as shown, consists of two armatures of the direct-current type mounted upon the same shaft 5, each armature being located within a magnetic field of its own. The controlling device 2 consists, preferably, of a dynamometer having two relatively movable coils in series with each other, one of the coils being fixed to a suitable supporting-base (not shown) and the other carried by a shaft, such as 6. These coils are indicated conventionally at 7 and 8 and require no detailed description, since they are of a construction well known in the art. The shaft 6 is provided with a contact making and breaking device consisting in the specific form shown of four radially-extending arms 9, 10, 11, and 12 of light springy construction. This contact device is intended to open and close the circuit of the armature 3 of the motor-generator, this armature being connected across the mains 13 and 14, from which it receives its driving-current. The resistance 15 may be used to reduce the flow of current to a proper amount. A spring 60 acts with sufficient force to separate the contacts of the contact device when no current flows. Returning to the description of the contact device by which the circuit of the motor element is closed and opened, it will be seen that the same consists of the four radial arms 9 to 12, already spoken of, these arms coöperating with corresponding fixed contacts 16, 17, 18, and 19. These fixed contacts are connected together by means of circuits containing resistance indicated at 20, 21, and 22. The contact-arms 9 to 12 being arranged so as to make contact successively with the fixed contacts 16, 17, 18, and 19 in the order named, thereby act to open or close the circuit of the motor element of the motor-generator, not abruptly, but gradually, through a step-by-step insertion or removal of the resistance mentioned. Thus, for example, suppose the contact-arms to move in a direction of rotation indicated by the arrow. The arm 9 then first makes contact with the fixed contact 16, thereby closing the circuit of the motor-generator through the four resistances 20, 21, 22, and 15 in series. A slightly greater degree of rotation causes the arm 9 to bend and brings the arm 10 against the fixed contact 17, thereby short-circuiting the resistance 20. A still further degree of rotation bends both of the arms 9 and 10 and brings the arm 11 against the contact 18, thereby short-circuiting the resistance 21. In the same manner the resistance 22 is likewise short-circuited, the rotation of the shaft of the dynamometer thereby acting to produce a gradual cutting out of resistance after the circuit has once been closed. As the motor-generator accelerates in speed, the electromotive force developed by its armature 4, being arranged in opposition to the difference of potential in the shunt 23 in one of the mains 13 and 14, reduces the resultant current in the coils 7 and 8 of the dynamometer, which, as shown, is in circuit with the armature 4 and the shunt 23. The shaft of the indicating instrument therefore returns to its original position, thereby cutting in the resistances 22 21 20, one after the other in the order named, and finally breaking the circuit of the motor 3 as the arm 9 leaves the fixed contact 16. The make and break of the motor-circuit takes place in the manner already above described and serves to maintain the speed of the motor-generator closely proportional to the quantity to be measured.

Figs. 2 to 9, inclusive, of the drawings represent a mechanical embodiment of a slightly-modified arrangement of my invention. The metering device in this case consists of a base-plate 24, upon which is mounted a permanent magnet 25, having pole-pieces 26 and 27. Between these pole-pieces is mounted the rotating member 28 of a motor-generator, this member consisting of a cylindrical shell open at one end and closed at the other, upon which shell are mounted two separate windings, each of which is connected to a commutator of its own. Figs. 4 and 5 represent this motor-generator armature somewhat more in detail than is done in Figs. 2 and 3. Between the pole-pieces 26 and 27 is also mounted an annular coil 29, pivoted upon an axis transverse to the magnetic field. This coil corresponds in function to the controlling device 2 in Fig. 1, but instead of being formed as a structure separate from the motor-generator is combined therewith to form a single mechanism. The coil 29 and its support are shown somewhat more in detail in Figs. 8 and 9. It will be seen that the coil 29 carries a depending arm 30, the lower end of which is allowed to oscillate back and forth between two adjustable contact-points 31 and 32, one of which serves merely as a back-stop, while the other is used for the purpose of making and breaking the connection of the motor-circuit of the armature 28. This armature, which has already been partially described, is geared to a counter or registering device 33 for recording the number of revolutions of the same. Inasmuch as it is necessary that the speed of the armature should closely follow the fluctuations of energy in the mains 13 and 14, it is made hollow in order to reduce its inertia, the hollow space within the armature being filled up by the upwardly-projecting cylinder 34 of magnetic material, this cylinder being retained in position by means of a plate 35, extending across between the pole-pieces 26 and 27. This mass of magnetic material (shown more clearly in Figs. 6 and 7) serves to increase the intensity of the magnetic field and at the same time preserve its constancy.

The mode of operation of the instrument thus described will be apparent by reference to Fig. 10. In this figure the motor-generator armature is shown at 28. The commutator 37, connected to the motor-winding, is in series across the mains 38 39, the circuit including a make-and-break device, comprising the fixed contact 31 and the movable contact 30, the adjustable back-stop being shown at 32. The commutator 40, corresponding to the generator-winding of the motor-generator, is connected in series in a circuit which includes the coil 29 and the shunt 41 in series with the main 38. As soon as current commences to flow in the main 38 the contacts 30 and 31, which by means of a slight overbalancing of the coil 29 or its connected parts are kept open when no current flows in the mains 38 and 39, are now closed, thus starting up the motor-generator. As the motor-generator increases in speed the electromotive force furnished by its generator-winding through the commutator 40 gradually counteracts the difference of potential in the shunt 41, to which it is opposed. When the two electromotive forces reach an equality, the contacts 30 and 31 open, interrupting the supply of energy to the motor-generator, which thereupon slows down slightly, thereby reducing its generator electromotive force and allowing current again to flow through the coil 29. The contacts 30 and 31 are again closed and the action goes on as before, the opening and closing taking place at such times as to preserve the speed of the motor-generator approximately proportional to the quantity to be measured.

It is evident that an invention of the character above described is capable of many modifications and numerous adaptations without departing from the spirit of the invention, in view of which I desire my claims to be construed accordingly.

What I claim as new, and desire to secure by Letters Patent of the United States, is—

1. In a metering device the combination of a circuit upon which is maintained an electromotive force varying with the quantity to be measured, an electromotive-force-generating device connected in opposition in said circuit, and a counter for recording the number of revolutions of said electromotive-force-generating device.

2. In a metering device the combination of a circuit upon which is impressed an electromotive force varying with the quantity to be measured, an electromotive-force-generating device connected in opposition in said circuit, and means for controlling the latter device so as to maintain an approximate balance between the electromotive forces in said circuit.

3. In a metering device, the combination of an electric motor, and means for opening or closing the circuit of the motor through a gradation of resistance when the speed of the motor approximates proportionality with the quantity to be measured.

4. In a metering device, the combination of an electric motor, and means for opening the circuit of the motor through a step-by-step gradation of resistance when the speed of the motor approximates proportionality with the quantity to be measured.

5. In a metering device, the combination of a source of variable electromotive force, a controlling device for causing variation of said electromotive force, and a circuit including said source of variable electromotive force, said controlling device, and an opposing source of electromotive force.

6. In a metering device, the combination of a motor-generator, a controlling device therefor responsive to the current to be measured, and connections including the generator and the controlling device in a circuit upon which is impressed an electromotive force representing the quantity to be measured.

7. In an electric metering device, the combination of a dynamometer connected so as to carry a portion of the current to be measured, a generator-armature also in circuit with said dynamometer, a motor arranged to drive the generator-armature, and means controlled by the dynamometer for starting and stopping said motor.

In witness whereof I have hereunto set my hand this 8th day of March, 1901.

WILLIAM H. PRATT.

Witnesses:
 ALEX F. MACDONALD,
 DUGALD McK. McKILLOP.